C. LEWANDO.
LOOM-SHUTTLE.

No. 189,633. Patented April 17, 1877.

WITNESSES
Frank G. Parker.
Leslie W. Miller

INVENTOR
Charles Lewando
Per William Edson Atty

UNITED STATES PATENT OFFICE.

CHARLES LEWANDO, OF BOSTON, MASSACHUSETTS.

IMPROVEMENT IN LOOM-SHUTTLES.

Specification forming part of Letters Patent No. 189,633, dated April 17, 1877; application filed September 18, 1876.

*To all whom it may concern:*

Be it known that I, CHARLES LEWANDO, of Boston, in the county of Suffolk and State of Massachusetts, have invented an Improvement in Shuttles, of which the following is a specification:

The nature of my invention consists in combining, with the spindle of a shuttle, an automatic lever working within said spindle, and, being provided with spurs, which serves to hold the cop onto the spindle, the lever being so arranged that when the spindle is down in the shuttle the spurs project beyond the surface of the spindle and penetrate the cop-tube, and thus hold it and the cop on; but when the spindle is up out of the shuttle the spurs are withdrawn, and the tube and cop are free to be removed from the spindle.

Figure 1:
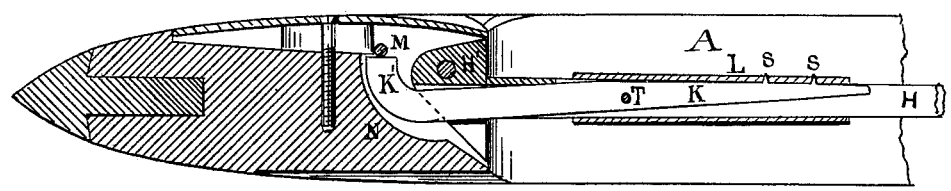
Figure 2:
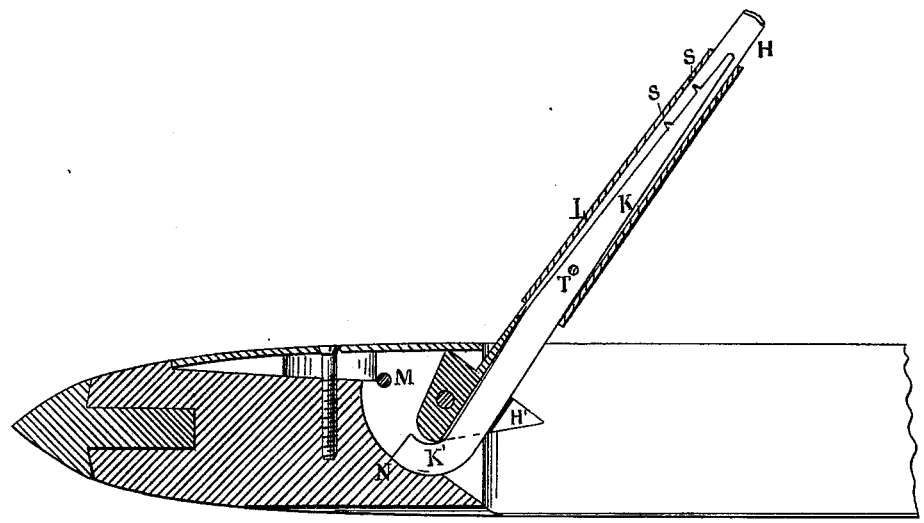

Figure 1 is a section through one end of a shuttle, showing my invention, the spindle being down. Fig. 2 is a section of the same, the spindle being up.

A represents a shuttle, made in the usual manner. H H' is a spindle, having in a slot in its center a lever, K, pivoted at T. This lever is provided with spurs S S, which serve to penetrate the cop-tube L, as shown in Fig. 1, when the spindle is down in the shuttle. When the spindle is thrown up, as shown in Fig. 2, then the spurs S S are withdrawn from the cop-tube L, and it and the cop are free to be removed.

The lever K is made to operate in the following manner: It terminates in an extension, K', which comes in contact with the pin M when the spindle is down, as shown in Fig. 1. Thus the end K, having the spurs S S, is thrown upward, causing the spurs S S to penetrate the tube L. (See Fig. 1.) When the spindle H is up, as shown in Fig. 2, then the end K' of the lever comes in contact with the wood of the spindle at N. This causes the forward part K of the lever to be withdrawn within the spindle and away from the tube L, thus releasing the tube from the spurs, and leaving it free to be taken off from the spindle.

I claim—

The combination of the lever K K' and the spindle H with the shuttle A and pin M, all operating together substantially as described, and for the purpose set forth.

CHARLES LEWANDO.

Witnesses:
WILLIAM EDSON,
NATHL. EVANS.